United States Patent [19]
Davidson, Jr. et al.

[11] Patent Number: 5,699,493
[45] Date of Patent: Dec. 16, 1997

[54] METHOD AND APPARATUS FOR PROVIDING JOB ACCOUNTING INFORMATION TO A HOST COMPUTER FROM A PRINTER

[75] Inventors: Peter Stewart Davidson, Jr.; Steve Michael Edwards; Kevin Patrick Goffinet; Francis Darrell Rafferty, Jr.; Gail Marie Songer; James Francis Webb; Lloyd Phillip Young, all of Lexington, Ky.

[73] Assignee: Lexmark International, Inc., Lexington, Ky.

[21] Appl. No.: 493,884

[22] Filed: Jun. 23, 1995

[51] Int. Cl.$^6$ .................................................. G06K 15/00
[52] U.S. Cl. .............................. 395/114; 395/112
[58] Field of Search ........................... 395/114, 113, 395/112, 101, 115–117, 200.01, 200.11, 828, 500, 835, 882, 892, 289, 864, 866, 867, 868, 727, 764, 765, 326, 527; 370/85.8, 449, 346; 399/8, 1, 2; 358/407, 437, 438, 439, 406, 404, 444, 468; 340/825.08

[56] References Cited

U.S. PATENT DOCUMENTS 5,323,393  6/1994  Barrett et al. ......................... 370/85.8

FOREIGN PATENT DOCUMENTS 0575168  12/1993  European Pat. Off. .

OTHER PUBLICATIONS

The Common Printer Access Protocol, by James D. Jones et al., Digital Tech.J., vol. 3, No. 4, Fall 1991.
Frank Hayes; "The Printers Talk Back"; Dec. 1993 pp. 103–104 & 106 & 108 & 110.
Network Printing Alliance Protocol, A Printer/Host Control Specification, Level 1, Revision N, Feb. 11, 1994, Developed By The Network Printing Alliance.

*Primary Examiner*—Edward L. Coles, Sr.
*Assistant Examiner*—Dov Popovici
*Attorney, Agent, or Firm*—John J. McArdle, Jr.; Frederick H. Gribbell

[57] ABSTRACT

An improved printing system is provided having at least one host computer and a printer in which the printer acquires print job accounting information and communicates it to the host computer via NPAP messages. A host computer downloads print job data to the printer through a communications port on the printer (i.e., either a parallel port, serial port, or network port), and as the printer prints the print job that it received from the host computer, the printer temporarily stores job accounting information. At the end of the print job, the printer communicates that job accounting information back to armed host computers via a bi-directional communications port, including typical information such as: the job identifier number, job processing time, number of sheets of paper from each paper source, number of impressions from each paper source (either one-sided or two-sided impressions), the port identifier, the network user name, the name of the print job (as specified), and the printer's serial number. Since the data is being accumulated at the printer, rather than at the host computer, there is no estimating by a host-resident program to acquire these statistics, and no data base merging (from several host computers) is required to categorize all of the data for one particular printer. Furthermore, the print jobs need not pass through a network queue in order to be detected and accounted for.

14 Claims, 11 Drawing Sheets

METHOD AND APPARATUS FOR PROVIDING JOB ACCOUNTING INFORMATION TO A HOST COMPUTER FROM A PRINTER

TECHNICAL FIELD

The present invention relates generally to the use of a laser printer connected to at least one host computer, either directly via a parallel or serial port, or through a network. The invention is specifically disclosed as a method for transferring "job accounting" information from a laser printer to a host computer, in which the "job accounting" information is stored on the host computer in a fie format easily usable by a database program, such as a spreadsheet.

BACKGROUND OF THE INVENTION

Printers receive print data from a source, such as a single host computer or a network that contains at least one host computer or network server. Printers that are connected to a network can serve more than one host, and a single host computer connected to a network can access more than one printer. In a configuration where a single printer is connected to a single host computer via a parallel port, for example, the capability of the printer can be enhanced by creating a function that allows a Systems Administrator using the host computer to easily keep track of "job accounting" information involving the printer, such as the printer's paper usage per paper tray.

The printer may also be connected to more than one host computer via a network. A recent development with respect to printers is the use of an internal network adapter or other interface circuit that allows bidirectional communication with host computers. Such hi-directional communication would typically be made using a protocol known as the Network Printer Alliance Protocol (NPAP) which provides a means for returning status information from a laser printer to a host computer. The bi-directional capabilities of such laser printers, particularly Model 4039 Plus™ and Model Optra™ and ink jet printers, particularly Model 4079 Plus™, both types of printers being manufactured by Lexmark International, Inc., are quite broad, and can be further enhanced by creating a function that allows a Network Administrator using the host computer to easily keep track of job accounting information involving the printer, including, for example, the printer's paper usage per paper tray (as noted above). Details of the published NPAP are contained in the NPAP Specification Level 1, Revision N, dated Feb. 11, 1994. This NPAP specification is incorporated herein by reference.

Printers contain a quantity of information which would be of interest to users and Network Administrators, particularly for error conditions and other job related information, such as duration of a print job, quantity of print jobs per unit time, number of pages per job, etc. Conventional printers that are connected to a network typically have their print jobs routed through a network queue that resides on a single workstation or network server personal computer. Conventional software is available that inspects the content of the print jobs in that queue, and these programs can estimate job statistics, such as the number of pages in a particular job. Such conventional programs are prone to error, since the program is required to process the print jobs in a similar manner as an actual printer, however, the actual printer can detect operational conditions or error conditions that the software running on the network server cannot be aware of.

In addition to the above problems, some conventional printers have the ability to physically connect to more than one network simultaneously. If print statistics are to be accumulated, a queue statistics computer program that resides on each of the personal computers where a network print queue exists would be needed, so that the individual queue information can be collected for a particular personal computer. To make this information useful, all of these databases must be then merged to get the statistics for any one printer in the network. Not only is this cumbersome, but is also error prone. Furthermore, certain networks known as TCP/IP allow for printing directly to a printer, so no network queue is available to supply information to a queue statistics computer program.

SUMMARY OF THE INVENTION

Accordingly, it is a primary object of the present invention to provide a printing system that includes a host computer and a printer that places the printer at the center of the process of collecting printer statistics, in which the printer temporarily stores job accounting information and then communicates that job accounting information to a host computer.

It is also an object of the present invention to provide a printing system that includes a host computer and a printer in which the printer is capable of communicating job accounting information to the host computer, and storing the job accounting information in memory at the host computer in a format that is easily useable by a spreadsheet or other type of database computer program.

It is another object of the present invention to provide a printing system having a printer that is connected to multiple computers in which the job accounting information is first temporarily stored in the printer, then communicated to a host computer where the job accounting information keeps an account of which printer port was used to import the print job from one of the multiple computers.

It is a further object of the present invention to provide a printing system having a printer and multiple host computers connected to the printer via a network, in which job accounting information of the printer is temporarily stored in the printer and then communicated to one or more of the host computers.

It is yet another object of the present invention to provide a printing system that includes at least one host computer and a printer, in which job accounting information is communicated to the host computer at the end of every print job, such that the job accounting information includes the following information: job identifier number, job processing time, number of sheets of paper from each paper source, number of impressions (allowing for duplexing or two-sided copying) from each paper source, the port identifier, an optional user name (which is user-specified, and can include the host's identifier, the user's identification, specific client-related information, etc.), the name of the print job (if specified), and the printer's serial number.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printing system is provided having at least one host computer and a printer in which the printer has a hi-directional data communications capability. The printer will preferably meet the standards of the Network Printer Alliance Protocol (NPAP) which defines an industry standard for bi-directional communications between a host computer and a printer, either over a network, or directly between such computer and printer. Using NPAP communications is preferable because NPAP allows for asynchronous responses to be communicated from the printer to the host independent of the data flowing from the host(s) to the printer. The host computer downloads print job data to the printer through a communications port on the printer (i.e., a parallel port, serial port, or network port), and as the printer prints the print job that it received from the host computer, the printer builds the job accounting information and, at the end of the print job, the printer communicates that job accounting information back to any attached host computer via a bi-directional communications port. Typical information included in the job accounting information is the job identifier number, job processing time, number of sheets of paper from each paper source, number of impressions from each paper source (either one-sided or two-sided impressions), the port identifier, the network user name (network dependent, and generated by a network adapter), the name of the print job (if specified), and the printer's serial number. Since the data is being accumulated at the printer, rather than at the host computer, there is no estimating required to acquire these statistics, and no database merging is required to categorize all of the data for one particular printer when print data was sent from more than one host. Furthermore, the print jobs need not pass through a network queue in order to be detected and accounted for.

More than one host computer can be provided with the job accounting information from one particular printer. A typical laser printer can have multiple communications ports, including a parallel port, a serial port, and at least one network port. A host computer could be connected to each of the direct ports (i.e., the parallel and serial ports), and multiple host computers could be connected to each of the network ports via the network itself. While it may not be typical for several host computers to be interested in accumulating the job accounting information for each printer of a network or printing system, the capability for this very occurrence exists when using the present invention. At the end of each print job, the printer can inquire as to which host computers presently active are "armed" to receive the job accounting information. After this quick inspection (which may be as quick as inspecting a look-up table in the printer or its Internal Network Adapter (INA) that contains data about armed hosts), the printer will communicate the job accounting information to each of the host computers presently so armed by sending individual NPAP wrapped communication messages, one such message for each of the host computers presently armed. The format for the job accounting information message is preferably in accordance with the NPAP industry standard, which is used for both local (i.e., parallel or serial port) and network communications protocol. Using this NPAP architecture, the printer can "Alert" the host computer with job accounting information, and the host computer can then process the job accounting information that the printer has transmitted. This all occurs using communications messages that are asynchronous with respect to the print job transmission from the host computer to the printer.

The operation in general terms of an exemplary embodiment of the present invention preferably involves a computer program at a host computer that enables the "tracking" of job accounting information at each printer of interest connected (either directly or via a network) to the host computer. Once tracking has been enabled, at the end of each data packet sent by the host to a printer, the host computer that is attached via a parallel port will ask the printer if it has any message to be sent to the host. A printer connected via a parallel port can respond with a message after the parallel port's direction is reversed, and the host computer also can receive and/or be interrupted by an "Alert" message from a printer that is attached via one of the network ports. If there is an "Alert" message from the printer via any type of port, the host computer imports a sequential communications message from the printer and determines whether or not there is a "Job Accounting Alert" being sent by the printer. If the message is a Job Accounting Alert, the host computer places that message into a text file that is easily accessible by a database or spreadsheet-type program.

The operation of a preferred laser printer is described as follows: the laser printer does not attempt to send job accounting information until after it has been enabled by a host computer. The printer accumulates job accounting information every time it receives a print job from any host computer. Once the print job has been completed, the printer sends the job accounting "Alert" to its communications ports that are connected to one or more "armed" host computers. At various times, the printer and/or its associated INA or external network adapter (or other type of network port) inspects a look-up data table to see which hosts are presently armed, this information having been provided by the above "enabling" message from each pertinent host. The precise handling of this message is dependent upon what type of port the host computer is attached to with respect to the printer, however, once the necessary handshaking has been exchanged between the printer and the respective host computer, the job accounting information is sent to each appropriate host from the port and via an asynchronous communications channel. The job accounting information can include many different aspects of the printer's operations, and would typically include (as a minimum) certain fundamental information such as a job identifier number, job processing time, number of sheets of paper used by each paper source with any laser printer, the port identifier which received the print job in the first place, the network user's name (generated by the INA), the name of the print job (if specified-generated by the INA), and the printer's serial number. All of this information is transmitted over the asynchronous communications channel to the appropriate host computer using a "Job Accounting Alert" NPAP message, which is received at the host computer and translated into a text file that is organized to be easily usable by a database program. Since the printer's message is essentially self-contained with respect to that particular printer's operations (i.e., that printer's entire set of accounting data is included in this message), no database merging is required to obtain all of the pertinent information with respect to this single printer. This is true regardless of what host computer sent which print job to that printer, and any host computer running the appropriate software can receive this job accounting information.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
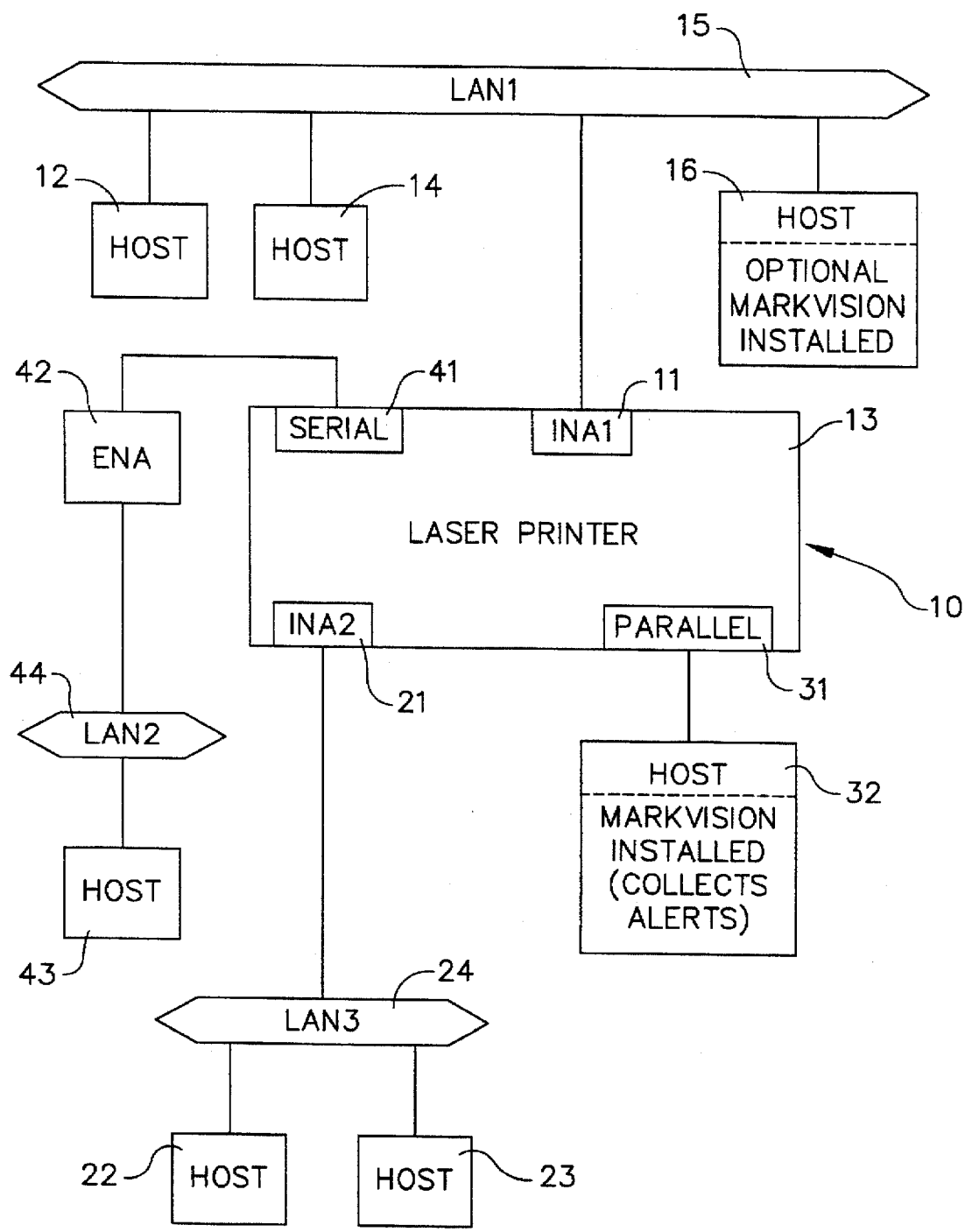
FIG. 1 is a diagrammatic view of a printing system having multiple host computers connected to multiple communications ports of a single laser printer, as relevant to the present invention.

Referring now to the drawings, FIG. 1 shows an exemplary circuit configuration generally designated by the index numeral 10 depicting a laser printer 13 connected to several host devices through the printer's various communications ports. The illustrated laser printer can have up to four such communications ports, including a network port connected via an internal network adapter (INA) 11, a second INA 21, a parallel port 31, and a serial port 41. The preferred INA 11 and INA 21 (referred to herein as INA1 and INA2, respectively) are mounted within the printer housing, and are of a type described in a co-pending commonly-assigned U.S. patent application, Ser. No. 08/350,860, titled MULTIPLE VIRTUAL PRINTER NETWORK INTERFACE, filed on Dec. 7, 1994, now U.S. Pat. No. 5,550,957, issued on Aug. 27, 1996 and which is expressly incorporated by reference herein. It will be understood that the present invention could also be implemented using other types of printers (including ink jet printers) having a communications port with a bi-directional capability.

INA1 and INA2 are connected to various host computers through a network, such as the local area networks (LANs) designated by the index numerals 15 and 24. Local area network 15 is designated as LAN1, through which laser printer 13 communicates via INA1 to host computers 12, 14, and 16. LAN 24, designated on FIG. 1 as LAN3, is used to carry communications between laser printer 13 and host computers 22 and 23 via INA2. It will be understood that these local area networks are available from several manufacturers, and that other configurations and other numbers of host computers can be attached to laser printer 13 without departing from the principles of the present invention.

Another local area network designated by the index numeral 44 is depicted on FIG. 1 and is connected to serial port 41 via an external network adapter (ENA) 42. The external network adapter 42 perlomas many of the same functions as the internal network adapters 11 and 21. Host computer 43 is connected to laser printer 13 via the serial port 41, ENA 42, and LAN2 (designated by index numeral 44). Another host computer designated by the index numeral 32 is directly connected to laser printer 13 via parallel port 31.

The various host computers depicted on FIG. 1 can be installed in close proximity to printer 13 or can be placed in locations quite remote from printer 13 as widespread in practical use, for example, as throughout an entire building or several buildings. Host computer 32 would typically be located in relative close proximity to printer 13 since its connection is directly through the printer's parallel port 31. Each of the host computers would typically be a personal computer or a workstation, such as a personal computer manufactured by IBM, and laser printer 13 is preferably a model Optra™ manufactured by Lexmark International, Inc., located in Lexington, Ky.

At least one of the host computers preferably contains a computer program named MARKVISION™, one version of which is a WINDOWS™ compatible program manufactured by Lexmark International, Inc. located in Lexington, Ky. On FIG. 1, host computer 32 specifically has MARKVISION™ installed to collect job accounting information from printer 13. One or more of the other host computers, such as host computer 16, can additionally have MARKVISION™ installed within. It will be understood that computer programs other than MARKVISION™ may also have the capability to receive and store job accounting information from laser printers without departing from the principles of the present invention. Such host computers would typically contain a long-term storage media, such as a hard disk drive.

It is preferred that printer 13 has bi-directional communications capabilities and operates according to the industry standard known as the Network Printing Alliance Protocol (NPAP). The NPAP includes a capability in which a particular manufacturer can provide optional features using "extensions," in which each extension includes a command that will be properly understood only by that particular manufacturer's printer. For example, extensions used by Lexmark printers may include in each command packet communicated over the LAN 15 a command byte having a value of E0 in hexadecimal. Printers manufactured by Lexmark International Inc. will respond to such commands written under the Lexmark extension, but printers manufactured by other companies would usually ignore any packet that contained the E0 command byte.

Figure 2:
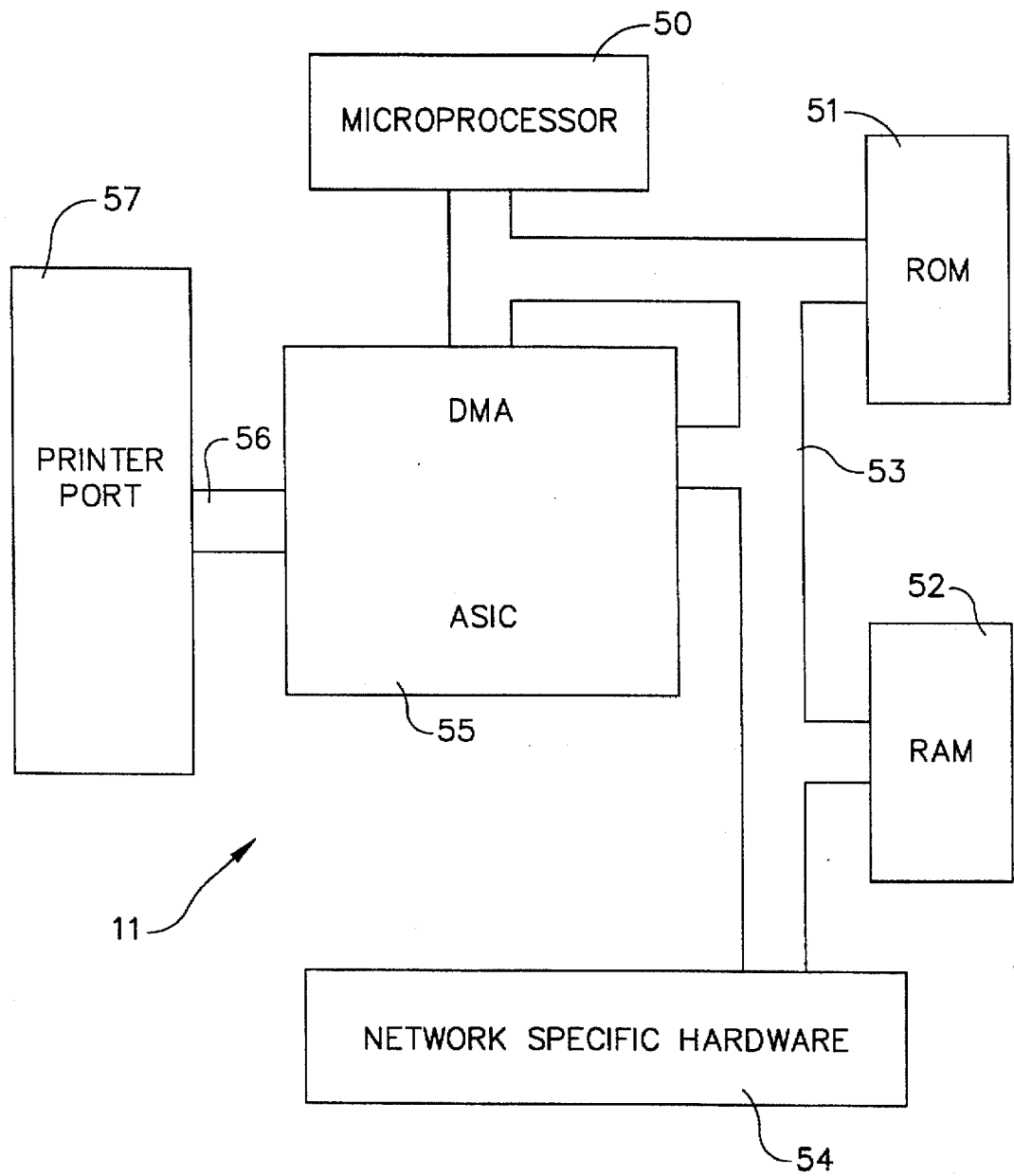
FIG. 2 is a block diagram of the internal network adapter that resides inside the printer of FIG. 1.

Referring now to FIG. 2, the internal network adapter (INA1) 11 includes a microprocessor 50 and associated read only memory (ROM) 51 and random access memory (RAM) 52, accessible to the microprocessor on a bus 53. In the present form of adapter, the microprocessor 50 is an Intel 80186 microprocessor; and host data received at a network specific hardware interface 54 is transferred by a direct memory access (DMA) controller ASIC 55 into the RAM 52. The DMA operation may be controlled by the microprocessor 50 or by the network specific hardware 54, dependent upon the network hardware platform to which the INA 11 is attached. Data read from the network specific hardware 54 into the RAM 52 is subsequently transferred across a printer port 57 by the DMA controller ASIC 55.

In the illustrated system, the network operating system is Novell Netware 2.2 or 3.11 or later. As shall be described subsequently, the host computers operating on the Novell Operating System network are set up to send NPAP-compliant commands to a particular "socket", or logical address, of the network specific hardware 54. Therefore, non-NPAP information, received at a different socket, can be transferred to the printer port 57 without processing in the manner that NPAP commands are processed by the microprocessor 50. The NPAP information is processed by the microprocessor 50 in accordance with the present invention, as shall be described subsequently.

To communicate data to the printer port 57, the data is presented on data lines, and one mode of a number of modes of communication is established by command lines. The data lines and command lines are collectively designated 56. Settings of the command lines can place the port 57 into data mode, menu mode, NPAP status mode or Device Status Alert (DSA) mode. In data mode, data is transferred across the printer port 57 to provide page information for print jobs. In menu mode, printer operator panel information is transferred across the printer port 57 from the printer controller to the INA. In NPAP status mode, NPAP-compliant commands are sent from the INA to the printer controller over the printer port 57, with the port remaining in NPAP status mode until an appropriate response is received from the printer controller. In setting DSA mode, the INA responds to a request from the printer controller to be allowed to send a status Alert. To do this the INA sets the printer port into DSA mode so that the printer can send the Device Status Alert to the INA.

Figure 3:
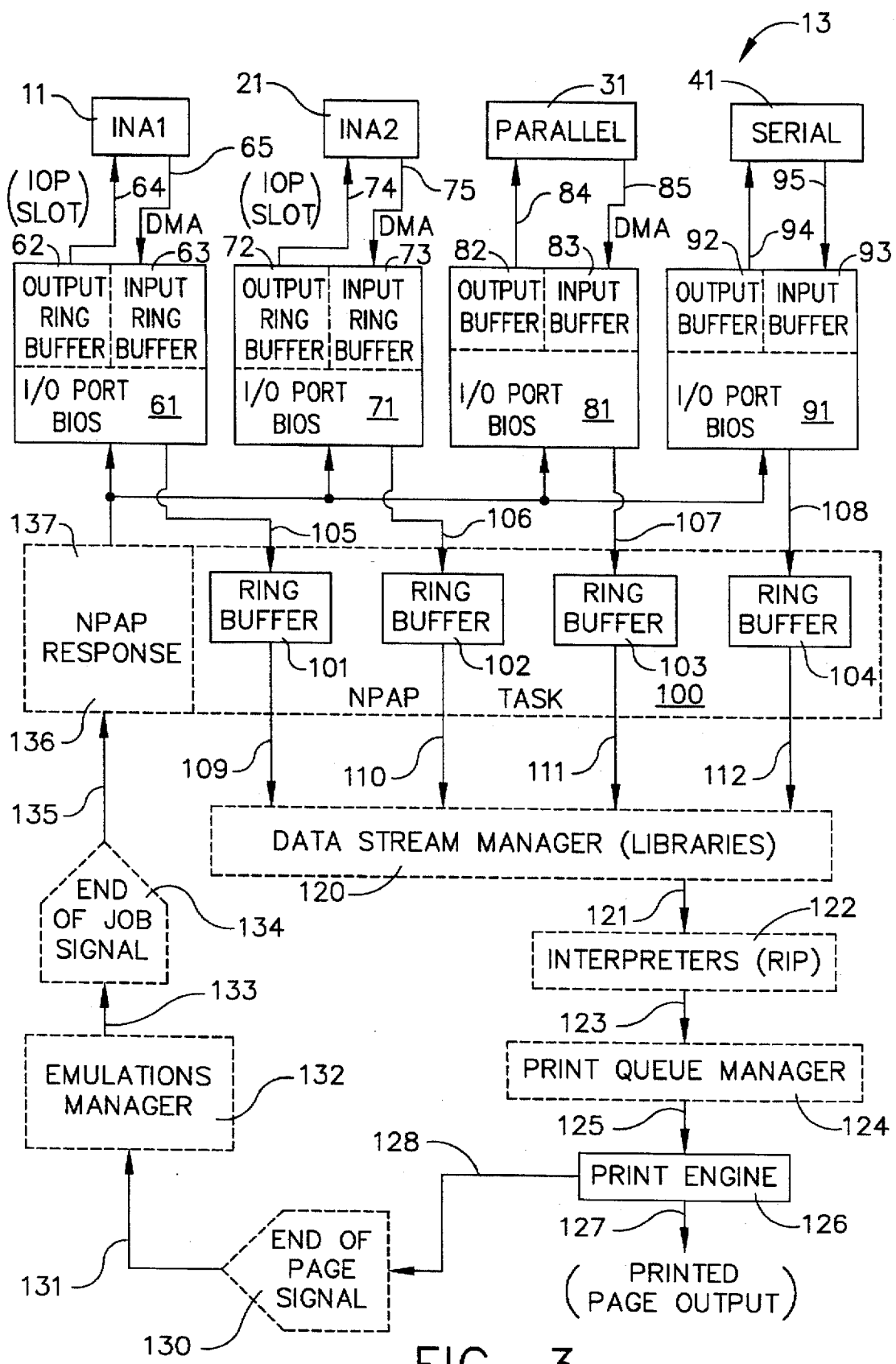
FIG. 3 is a combination block diagram and functional block diagram of the laser printer as used in the printing system of FIG. 1, and as relevant to the present invention.

With reference now to FIG. 3, a laser printer 13 as configured for use with the present invention includes a printer controller, relevant portions of which are shown functionally. The microprocessor-based controller performs functions which include a number of tasks, the relevant ones of which are indicated in the figure, and has access to a number of libraries of code which may be called by the tasks to perform various functions. The tasks are activated by timer counts or interrupts to perform functions, as shall be described hereinbelow.

The exemplary printer controller is capable of effecting the usual printer functions such as maintaining a control panel, interpreting incoming print jobs received in one or more printer control languages, and rasterizing and serializing the interpreted data to drive a laser printer engine. The exemplary controller includes the ability to communicate through parallel, serial and network ports bi-directionally using NPAP. The principal task for handling NPAP-compliant commands and data is the NPAP Task 100.

Communications data received by INA1 is passed by direct memory access (DMA) along path 65 to an input ring buffer 63, which is part of the I/O port BIOS 61. Similarly, communications data received by INA2 is passed by direct memory access along path 75 to input ring buffer 73 of I/O port BIOS 71. INA1 and INA2 preferably are printed circuit boards that plug into the printer's IOP ("Internal Option Port") slots, which can also be used to interface with an optional hard disk drive.

Communications data received by the parallel port 31 is communicated by direct memory access along path 85 to an input buffer 83, which is part of I/O port BIOS 81. Similarly, communications data received at serial port 41 is communicated along path 95 to input buffer 93, which is part of I/O port BIOS 91. Using this preferred configuration for the communications ports and the I/O port BIOS circuits, data is received very quickly and efficiently transferred through the initial circuitry of printer 13 with minimum delay, however, it will be understood that other circuit configurations could be utilized without departing from the principles of the present invention.

Each of the I/O port BIOS circuits individually communicates data to individual ring buffers that are associated with the NPAP Task, generally designated by the index numeral 100. The INA1 I/O port BIOS 61 communicates to ring buffer 101 via path 105, INA2 I/O port BIOS 71 communicates to ring buffer 102 via path 106, parallel port I/O BIOS 81 communicates to ring buffer 103 via path 107, and serial I/O port BIOS 91 communicates to ring buffer 104 via path 108.

The NPAP Task 100 performs the functions of handling commands and data in the NPAP (Network Printing Alliance Protocol) format. The NPAP Task supplies printer status information to direct attached and network attached host computers and receives requests for such information from the host computers. The NPAP Task 100 is activated periodically by a timer, and when it is activated the NPAP Task calls the Port BIOS 81 and 91 for the serial and parallel ports and the Port BIOS 61 and 71 for the INA ports to determine if there is received data at one or more of the ports. If an NPAP command is received, the NPAP Task 100 responds through the appropriate port either directly or after obtaining needed information from another function in the printer controller. Before describing operation of the NPAP Task in more detail, its control state will be described.

The NPAP Task may be "on", "off" or "auto" for each port, serial, parallel or INA. If the NPAP Task is off, print data is directly provided from the Port BIOS 61, 71, 81, or 91 to the Data Stream Manager 120, as shall be described. If the NPAP Task is on, then only data in NPAP format will be passed through (after removal of NPAP wrappers) to the Data Stream Manager, with other inputs being rejected. If the NPAP Task is in auto mode, then non-NPAP data will be passed through, and the NPAP Task processes NPAP commands and data.

The NPAP Tasks ring buffers 101–104 individually communicate data via paths 109–112 to a Data Stream Manager, designated by the index numeral 120. Data Stream Manager 120 constantly attempts to find an input data stream from one of the data lines 109–112, and once a particular line becomes active with data, Data Stream Manager 120 "grabs" that particular line and remains attached to that line until that line runs out of data. Data Stream Manager 120 mainly comprises software tasks, but also contains libraries of information which aid the Data Stream Manager 120 in determining which interpreter within printer 13 should be used to operate upon the incoming data message. Once this has been determined, Data Stream Manager 120 outputs the communications data via path 121 to the correct interpreter (collectively designated by the index numeral 122), after which event raster image processing (RIP) is performed by the interpreter.

When none of the interpreters 122 are running to provide data for subsequent rasterization and serialization in the printer, the Emulation Manager Task (not shown) looks for print data at a port to direct to the appropriate interpreter. In the absence of the NPAP Task 100, the Emulation Manager Task calls Data Stream Manager 120 functions to transfer print data from the Port BIOS 61, 71, 81, or 91 to a buffer. If the NPAP Task is functioning for a particular port, the Data Stream Manager 120 accesses data from an NPAP Task buffer for that port. The Emulation Manager and Data Stream Manager also cooperate to associate a "job structure" with each print job received at a port. The job structure includes an identification number for the print job, the number of pages to be printed, and information on resolution and other specifics. The job structure data is also capable of being modified during the printing process to update the status of the job.

The Emulation Manager 132 also cooperates with the Data Stream Manager 120 to route each print job to the appropriate interpreter (such .as a PostScript or a PCL interpreter) for that print job. The Data Stream Manager passes the print job data in the appropriate language to the selected interpreter until the end of the job, when the Data Stream Manager provides an end-of-job condition to the interpreter. After the data has been RIP-ed, the data (now in bitmap form) is communicated via path 123 to a Print Queue Manager 124, which provides print jobs on a page-by-page basis to the Print Engine 126, via path 125. Once the data reaches Print Engine 126, hard copy pages are output from laser printer 13 at the printer paper output 127. When the interpreter is finished with the print job, it indicates this to the Emulation Manager Task, so that the job structure data can be modified if desired.

The Options Manager Library (not shown) provides a high level interface through NVRAM BIOS to non-volatile RAM in the printer. Options Manager (not shown) is used by the Emulation Manager Task 132 in creating job structure information where such information is derived from NVRAM values. The NPAP Task 100 also can communicate with the Options Manager (not shown) to read and write NVRAM settings.

The Printer State Task (not shown) first learns of outside (to the controller code) events occurring in the printer. The Printer State Task notes, for example, if the printer cover has been opened and orchestrates providing this information to the front panel and to any other users of such information such as the NPAP Task 100. The Printer State Task will become aware of certain conditions due to hardware interrupts to the processor, while other status information is checked by the Printer State Task on a polling basis. Printer configuration changes, Device Status Alerts, and changes to the printer front panel are passed from the Printer State Task (not shown) to the NPAP Task 100 for communication to attached host computers.

It will be understood that other hardware and software configurations for implementing the laser printer 13 could be substituted for the illustrated embodiment without departing from the principles of the present invention. This is particularly true for the arrangement of software/firmware used by laser printer 13, as depicted in FIG. 3—the Options Manager (not shown) and its method of controlling the NVRAM could be designed to operate in various manners, while still effectively performing the same tasks.

The preferred laser printer 13 will include an operator control panel which can be either manually-accessed by a local user, or remotely-accessed by a Network Administrator. Such laser printers are currently available, as described in a co-pending commonly-assigned U.S. patent application, Ser. No. 08/394,086, titled REMOTE REPLICATION OF PRINTER OPERATOR PANEL, filed Feb. 24, 1995, and which is expressly incorporated by reference herein.

It will be understood that the precise embodiments illustrated in FIG. 2 and 3 are not required to perform the functions of the present invention, however, to utilize the NPAP industry standard, a laser printer must have bi-directional communications capability, and it must have the capability to store job accounting information in memory. Furthermore, such a laser printer should have the capability of having its job accounting information contents uploaded into a host computer, so that the host computer can store that same job accounting information upon its own storage media, such as in a file residing on a hard disk drive. Once a file is created at the host computer, it will be understood that the contents of such file can be accessed by a database program or by a spreadsheet program.

As Print Engine 126 finishes each page of hard copy output, it sends a signal via path 128 to a task that signals that the printer has arrived at the end of the page (designated by the index numeral 130 on FIG. 3). This "flag" is then sent via path 131 to the Emulations Manager 132, which determines whether or not printer 13 has reached the end of the entire job. When the end of the job has been reached, the Emulations Manager 132 outputs a signal via line 133 to a signal flag 134, which in turn sends a message along line 135 to a portion of the NPAP Task designated as the NPAP Response, which is indicated by the index numeral 136.

At this time, the NPAP response task 136 outputs a signal along lines 137 to each of the I/O ports BIOS 61, 71, 81, and 91. The appropriate message is temporarily stored in an output ring buffer 62, 72, 82, or 92 (depending upon which of the communications ports is the appropriate port to receive this message), and a message is communicated to one or more of the LNA1, LNA2, parallel port, or serial port, via paths 64, 74, 84, or 94, respectively. After that occurs, the appropriate communications message is then transmitted back to the appropriate host computer that is attached to either a network (such as LAN1, LAN2, or LAN3) or is attached directly to parallel port 31. The details of the functional operations involved in these messages is described hereinbelow.

Figure 4A:
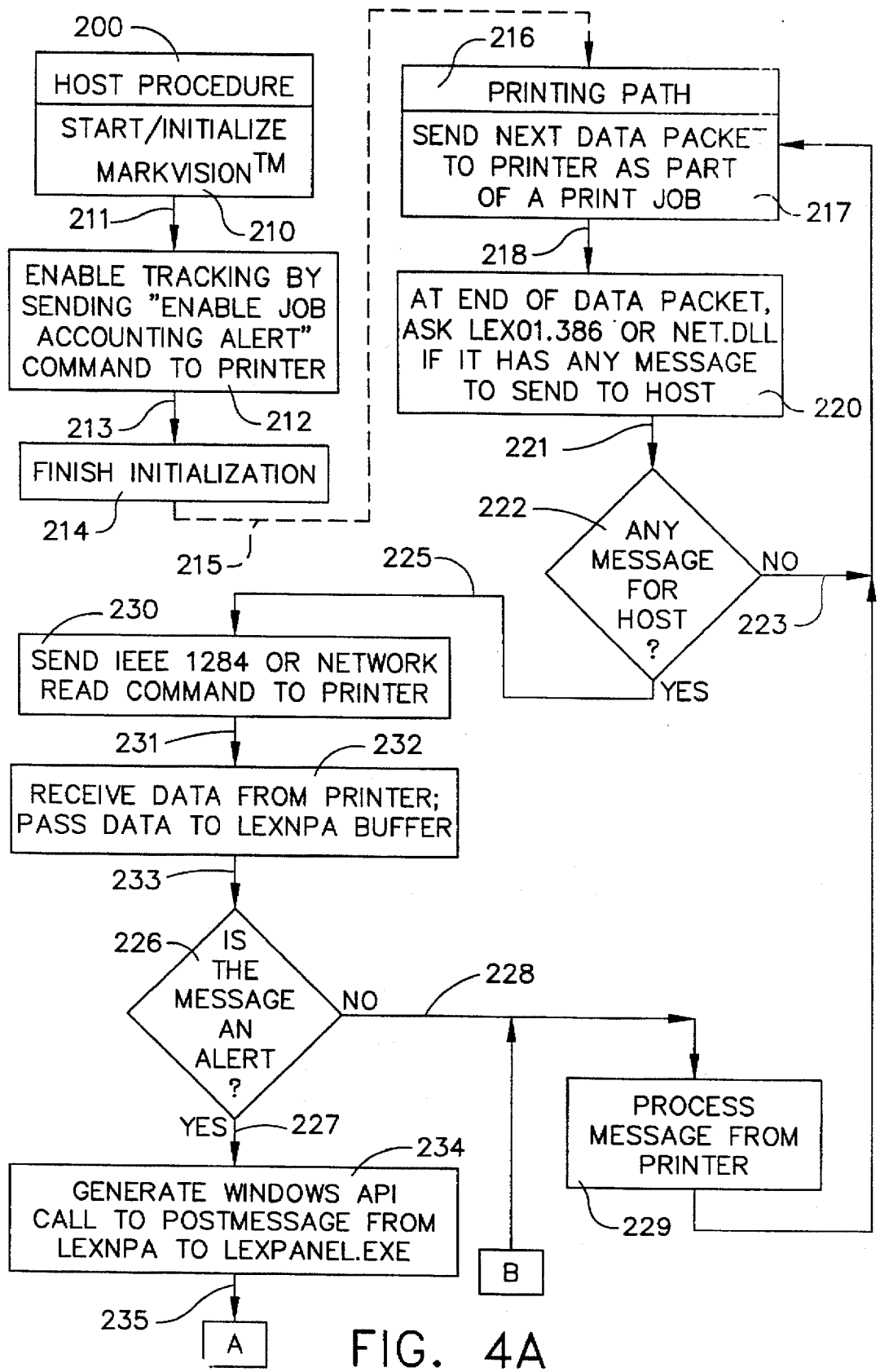
FIGS. 4A and 4B represent a flow chart of the operation of one of the host computers of FIG. 1, depicting the logical steps required to enable tracking, to import a Job Accounting Alert message from the printer of FIG. 1, and to create a text file or a new entry into a text file that contains job accounting information.

FIG. 4A depicts the first portion of a flow chart of the steps that a host computer (e.g., host computer 32) undergoes to perform the necessary tasks to implement the "host" side of the preferred embodiment of the present invention. A Systems Administrator or a Network Administrator must access a computer program at the host (i.e., a Systems Administrator could use host 32 without involving a network, since host 32 is directly connected to the printer's parallel port 31), and this program preferably is a WINDOWS™-compatible program called MARKVISION™, manufactured by Lexmark International, Inc., located in Lexington, Ky. The host procedure is designated by the index numeral 200, which is started and initialized at a function block 210.

After initialization, the logical flow follows arrow 211 to a function block 212 in which the "tracking" function is enabled, in which the host sends an "enable Job Accounting Alert" command to a particular printer (i.e., printer 32). In the present invention, this command preferably is an NPAP-type command, having the following format:

A5 00 04 50 E0 03 01

Figure 4B:
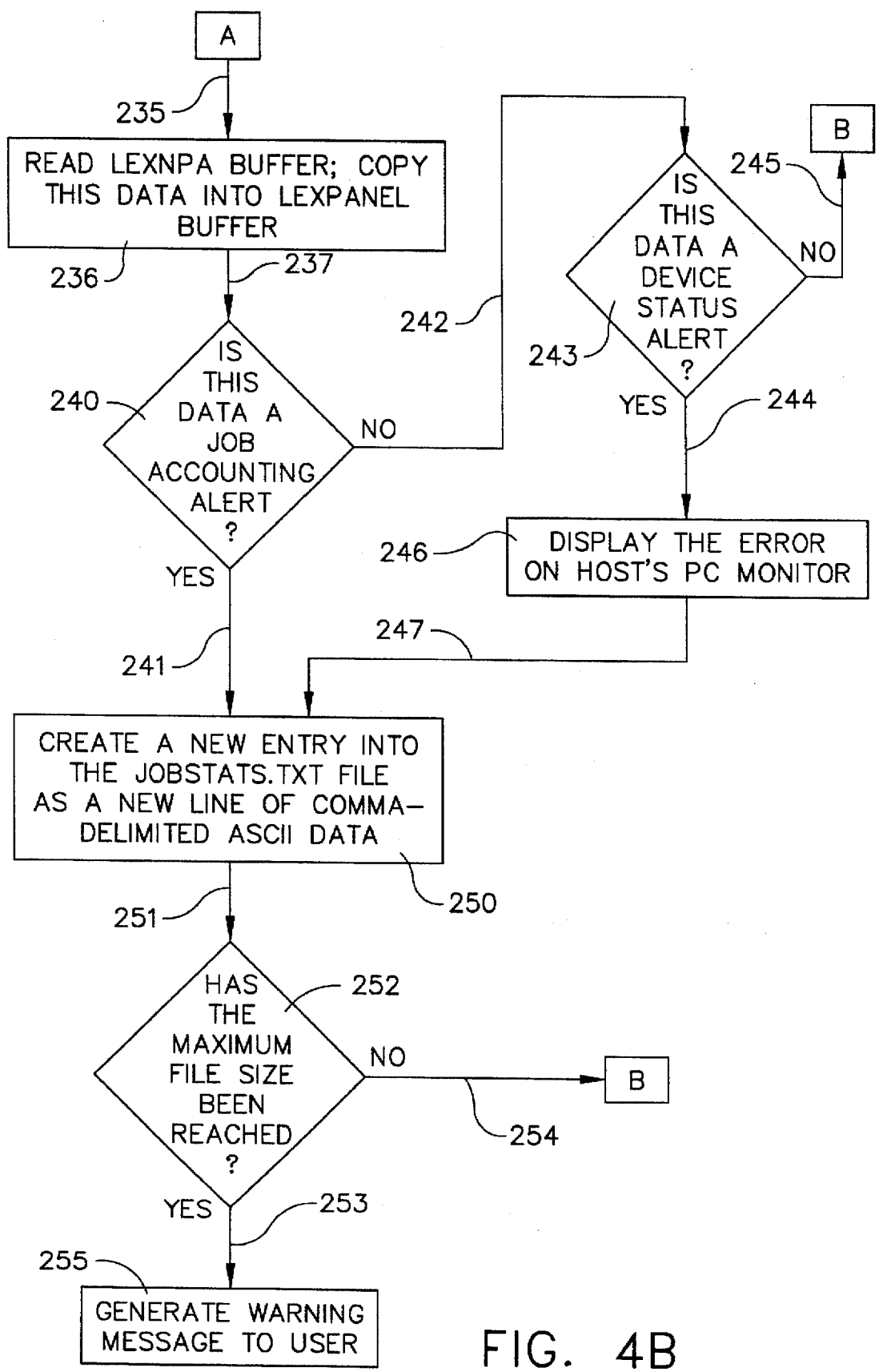

The logic flow travels along arrow 213 to the end of the initialization procedure for MARKVISION™, at function block 214. MARKVISION™ and its components perform many different tasks, and one of them is to control the sending of print jobs to various types of printers, such as indicated on FIG. 4A by the path 215 terminating in a "Printing Path" task 216. Printing Path 216 begins by sending packets of data to printers as part of print jobs, under the control of function block 217. The following description, including the flow chart depicted in FIGS. 4A and 4B, describe the operations of host computer 32 while in the "active" print mode, in which print job data is being downloaded to a printer.

Using the preferred MARKVISION™ computer program at the host computer 32, it will be understood that this computer program comprises several executable and data files, and in one preferred embodiment, the high-end executable program is titled LEXPANEL•EXE. LEXPANEL•EXE is the main executable program, and this program interacts with another program titled LEXNPA•DLL, which handles the NPAP-type data transactions between the host computer and one or more printers that are capable of utilizing NPAP commands. LEXNPA•DLL interacts with more than one module or program, depending upon which type of port of the host computer is being used to talk to a particular printer. If the port is accessing a network, then a computer program titled NET•DLL is used to perform the necessary interfacing with the network. If the pertinent port is the parallel port, then a program titled LEX01.386 is used to interface with the parallel port.

Following path 218, function block 220 asks LEX01.386 (or NET•DLL), at the end of each data packet, whether or not there is any message to be sent to the host—this message would originate at the printer and is to be directed to LEXNPA•DLL and LEXPANEL•EXE. Noting that this portion of the flow chart of the host procedure 200 does not include the functional steps for downloading print job data, it will be understood that function block 220 occurs at the end of a data packet that is associated with a print job. The logical flow travels along arrow 221 to a decision block 222 that determines whether or not any message has been received from the printer at this time. If the answer in NO, then the logical flow follows arrow 223 and returns to the beginning of the Printing Path 216.

If the answer to decision block 222 is YES, then the logical flow follows arrow 225 to a function block 230. This received message may be a Job Accounting Alert, and if so, it will contain the job accounting information. Since the non-parallel ports of the host computer are full duplex, host computer 32 can virtually simultaneously send data to the printer while also waiting to detect an Alert message from the printer. No polling is required at function block 220 (while under the control of the program module NET•DLL that controls the non-parallel ports), since the full duplex mode can be utilized to advantage without having to reverse the channel from the host computer which would waste valuable time. On the other hand, since most parallel ports (even hi-directional communications capable parallel ports) have only half duplex capability, a "call-back" to the host computer as per IEEE standard 1284 will be generated to reverse the direction of the parallel port. Once the printer port has changed direction, the message can be received from the printer 13, which is then analyzed by a decision block 226.

Function block 230 generates a bi-directional read (BidiRead) command, in the form of an IEEE 1284 "mad" or a network "read" command to the printer, is then used to read in the data communications message from printer 13. After the BidiRead command is generated, the logical flow travels along arrow 231 to a function block 232 in which a communications message is received from the printer in the form of a "Job Accounting Alert" NPAP data message, which is a rather long message having the format as depicted in Table #1, provided below:

TABLE 1

6-9-2 Job Accounting Alert
Printer Alert

Command: Lexmark Alert
Subcommand: Job Accounting Alert

| Byte | Value - Hex | Description | Notes |
|---|---|---|---|
| 1 | A5 | Start of Packet Byte | Packet Header |
| 2 | Unsigned Word | Length in Byte (Does not include these 2 bytes nor the SOP byte) | |
| 1 | Unsigned Byte | Flag | |
| 1 | F0 | Command: Lexmark Alert | |
| 1 | 03 | Subcommand: Lexmark Extension Alert | Data Field |
| 1 | 0x01 | Job Accounting Alert | |
| 1 | Unsigned Byte(i) | Number of input sources | |
| 1 | Unsigned Byte | Completed job logical unit number | |
| 2 | Unsigned Word | Completed job ID | |
| $2^1$ | Unsigned Word | Completed job processing time in seconds | |
| 4 | Unsigned Double Word | Completed job sheets from input source 1 | Input 1 |
| 4 | Unsigned Double Word | Completed job impressions fro input source 1 | |
| 4 | Unsigned Double Word | Completed job counter units from input source 1 (not supported) | |
| . | . | . | |
| . | . | . | |
| 4 | Unsigned Double Word | Completed job sheets from input source i | Input i |
| 4 | Unsigned Double Word | Completed job impressions from input source i | |
| 4 | Unsigned Double Word | Completed job counter units from input source i (not supported) | |
| 2 | Unsigned Word | Reserved | |
| 1 | Unsigned Byte | Port, ID | |
| 1 | Unsigned Byte | User defined string length, not including this byte | |
| n | ASCII | User defined string as compiled by the "E0 02" and E0 30" commands | |
| 1 | Unsigned Byte | Length of the printer's serial number, not including this byte | |
| n | ASCII | Serial Number | |

TABLE 1-continued

6-9-2 Job Accounting Alert
Printer Alert

Command: Lexmark Alert
Subcommand: Job Accounting Alert

| Byte | Value - Hex | Description | Notes |
|---|---|---|---|
| 4 | Unsigned Double Word | Number of bytes in job. | |
| 2 | Unsigned Word | Number of bytes in the following record of input specific information | Input 1 |
| 4 | Unsigned Double Word | Number of Contone pages from Input 1 | |
| 4 | Unsigned Double Word | Number of 4 plane pages from input 1 | |
| : | : | : | |
| : | : | : | |
| : | : | : | |
| 2 | Unsigned Word | Number of bytes in the following record of input specific information | Input i |
| 4 | Unsigned Double Word | Number of Contone pages from Input i | |
| 4 | Unsigned Double Word | Number of 4 plane pages from input i | |

Note: This alert is only returned in printer specific extension revision level 2 or greater.
"Number of Bytes in Job" is available in printer specific extension revision level 5 or greater.
"Input specific information" is available in printer specific extension revision level 6 or greater.

| ID | Port |
|---|---|
| 0x00 | Parallel |
| 0x01 | Serial |
| 0x02 | Network 1 |
| 0x03 | Network 2 |
| 0x04 | Internal (test pages) |
| 0x05 | Local Talk |

If the data was received from the printer's parallel port (i.e., parallel port 31 on printer 13), the program module LEX01.386 will pass the data to a buffer controlled by LEXNPA•DLL. If the Job Accounting Alert data message comes in through one of the full duplex ports (such as a network port via an INA), then the program module NET•DLL will interface with the network and then pass the data to the LEXNPA•DLL buffer. The logical flow travels along arrow 233 to decision block 226 which determines whether or not there has been an Alert received from the printer. If the answer is NO, the logical flow travels along arrow 228 to a function block 229 which processes the message from the printer. If the answer is YES, the logical flow follows arrow 227 to a function block 234 which generates a WINDOWS™ API call to post a message ("PostMessage") from LEXNPA•DLL to LEXPANEL•EXE. It should be noted that, according to the preferred computer program MARKVISION™, the same steps for host procedure 200, in the circumstances of receiving either a Job Accounting Alert or a device status Alert (DSA), are followed at this point in the flow chart.

After LEXPANEL•EXE is made aware that an Alert message has been received (under the control of function block 234), the logical flow travels along arrow 235 (from FIG. 4A to FIG. 4B) at the letter "A", then arrives at a function block 236 which causes the contents of the LEXNPA•DLL buffer to be read and copied into the buffer for LEXPANEL. The logical flow follows arrow 237 to a decision block 240 which determines whether or not this data message is a Job Accounting Alert or not. If the answer to this question is NO, the logic flow follows arrow 242 to a decision block 243 which determines whether or not the data message is a device status Alert. If the answer to this question is NO, logical flow follows arrow 245 and then back to flow chart on FIG. 4A via the letter "B". If the answer to decision block 243 is YES, the logic flow follows arrow 244 to a function block 246 which displays the error on the host's PC monitor. Since MARKVISION™ is a WINDOWS™-based program, LEXPANEL•EXE could be either maximized or minimized upon the reception of the device status Alert. If minimized, the MARKVISION™ icon starts blinking. If maximized, the actual error condition that is reported by the device status Alert message is displayed on the PC monitor. Once the error has been displayed, the logical flow follows arrow 247 to a function block 250.

If the answer to decision block 240 is YES, the logical flow follows arrow 241 to function block 250 which creates a new entry into a text file that holds messages from the printer 13 in the form of either a Job Accounting Alert or a device status Alert. This text file preferably can named by the system user, typically the Systems Administrator or the Network Administrator, and should have a default name provided by the host procedure computer program (e.g., MARKVISION™) such as a file name of JOBSTATS•TXT. The new entry into this JOBSTATS file is preferably a new line of comma-delimited ASCII data.

This comma-delimited ASCII data is not in the precise form as received from printer 13. Instead, certain translation of this data preferably occurs before it is placed into the JOBSTATS•TXT file, including converting from binary numbers to ASCII characters. For example, instead of placing the entire user defined name in one comma-delimited field in the JOBSTATS•TXT file, several key value pairs may be parsed from this name and placed in separate comma-delimited fields. A key value pair consists of a key followed by a colon followed by its value. Multiple key value pairs within the user defined name are separated by a semicolon. Some of the keys that may be used are defined in Table #3. In general, the data contained in the Job Accounting Alert is recorded directly in the JOBSTATS•TXT file in a comma-delimited text format which is easily read by most common database programs. The JOBSTATS•TXT file contains a series of records where one record represents the new entry and also is used as a single line in the job statistics data file. Each record preferably comprises forty-nine (49) data fields, separated by commas, and a description of these 49 data fields is provided below in Table #2.

TABLE 2

Job Statistics Data File
This is the file where MarkVision records printer job statistics. Job statistics are recorded only for the printers for which tracking has been turned on. The location and name of this file may be changed by choosing | Change File from the Job Statistics dialog menu.
Each line in the Job Statistics data file is one record. Each record consists of 49 data fields, separated by commas. Each record represents either a completed print job or an error condition reported by a printer. If a record represents an error condition, it will appear in the error condition data field
(field 49). If the error condition field is empty, the record represents a completed print job. The meanings of all fields are listed below.

1. Port name (variable character)
2. Day of week (fixed character, length=3)
3. Month (fixed character, length=3)
4. Day of month (integer)
5. Time (fixed character, length=8)
6. Year (integer)
7. Number of input sources (integer)
8. Job logical unit number (integer)
9. Job ID (integer)
10. Job processing time (integer)
11. Manual sheet feeder total sheets (integer)
12. Manual sheet feeder total impressions (integer)
13. Not supported (currently = 0)
14. Manual enveloper feeder total sheets (integer)
15. Manual enveloper feeder total impressions (integer)
16. Not supported (currently = 0)
17. Tray 1 total sheets (integer)
18. Tray 1 total impressions (integer)
19. Not supported (currently = 0)
20. Tray 2 total sheets (integer)
21. Tray 2 total impressions (integer)
22. Not supported (currently = 0)
23. Automatic envelope feeer total sheets (integer)
24. Automatic envelope feeder total impressions (integer)
25–40. Not supported (currently = 0)
41. Port ID (integer)
42. Host name (variable character)
43. User name (variable character)
44. Source protocol (variable character)
45. Job name (variable character)
46. Queue name (variable character)
47. Other job data (variable character)
48. Printer serial number (variable character)
49. Error condition (variable character)

Figure 7:
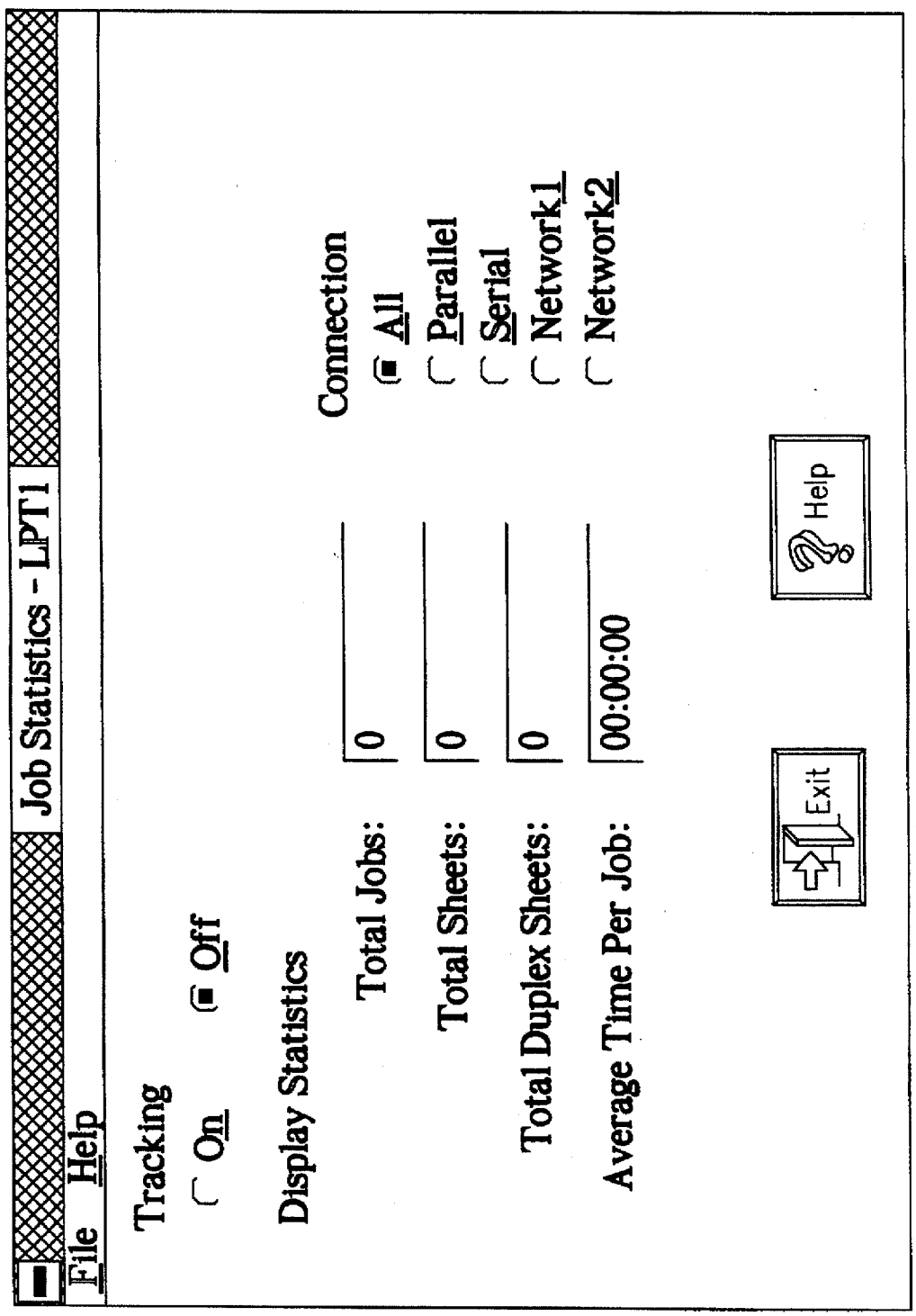
FIG. 7 is a diagrammatic view of one of the display screens of the host computer depicted in FIG. 1, while utilizing the "Job Statistics" feature according to the present invention.

Virtually any database computer program or any spreadsheet program (such as Lotus 1-2-3 or Excel) can be used to display and organize the comma-delimited ASCII data file created by MARKVISION™ as it receives Job Accounting Alerts and device status Alerts. Furthermore, the MARKVISION™ computer program itself is capable of tabulating some of the information received by the Job Accounting Alerts, such as provided by the WINDOWS™ screen titled "Job Statistics—LPT1", as depicted on FIG. 7.

After an attempt has been made to insert the new entry into the JOBSTATS file, the logical flow follows arrow 251 to a decision block 252, which determines whether or not the maximum file size (on the host computer 32) has been reached. If the answer is NO, the logical flow follows arrow 254 and back to FIG. 4A at letter "B". If the answer is YES, the logical flow follows arrow 253 to a function block 255 which generates a warning message to the host computer's user. In addition, the user is provided with three choices when the warning occurs: (1) "Abort," which turns off the "tracking" function and discards this most recent data record; (2) "Retry," which allows the user to change the data file location or its maximum size and try again; or (3) "Ignore," which discards this single data record and continues tracking. Of course, if the "Ignore" choice is selected, the same error will re-occur the next time an attempt is made to make a new entry into the JOBSTATS•TXT file, unless the host computer's user has either deleted some of the data in the JOBSTATS•TXT file, or increased its allowable maximum file size.

The host computer that is running MARKVISION™ (and Job Accounting) may not be the same host computer where print jobs are originating. In this situation, the host running MARKVISION™ (e.g., host 32 on FIG. 1) may spend a large amount of time "waiting" for data communications to arrive at its serial, parallel, or network ports. During the "waiting" or "idle" condition, LEXPANEL•EXE waits for the occurrence of a message from LEXNPA•DLL indicating that an "Alert" condition exists at a particular printer. If the data communications is via a parallel port, then LEX01.386 reverses the data channel, so that the host computer is "listening" for printer initiated events. If the data communications is via a network port, NET•DLL will "listen" for printer initiated events (the port is full-duplex capable).

When the printer receives a print job from another host computer (e.g., host 16 on FIG. 1), which could be received at the printer at a separate port (e.g., network port 11 on FIG. 1), printer 13 completes the printing job. Printer 13 generates a communications message to host 32 via, for example, parallel port 31 (note that host 32 is running MARKVISION™, but not sending print data at this time-essentially operating in an "idle" state for the purposes of the present invention). LEX01.386 detects, via the IEEE 1284 standard protocol, that the printer has a message for the host computer 32 and generates a call to LEXNPA•DLL to inform LEXNPA•DLL that a message is ready to come in from printer 13 (which are similar steps to the steps 220 and 222 on the flow chart of FIG. 4A). LEXNPA•DLL receives the call and sends the "Alert" to LEXPANEL•EXE by generating a WINDOWS™ API call to PostMessage (similar to function block 234 on FIG. 4A).

Note, however, if the Alert is communicated via a network port to host computer 32, LEXNPA•DLL receives the call and sends a Read Command to NET•DLL to read the message from printer 13, allocates its own memory, and stores the data in that memory. At this point, a WINDOWS™ API call to PostMessage is generated (similar to function block 234 on FIG. 4A).

When LEXPANEL•EXE processes the result of the PostMessage, LEXPANEL•EXE calls LEXNPA•DLL to query the printer of any additional Alert information. On making this call, LEXPANEL•EXE passes a memory buffer for use by LEXNPA•DLL to copy any data into. In the parallel port scenario, LEXNPA•DLL will then BidiRead (to LEX01.386) to read in the Alert and any additional information that printer 13 may have on the Alert, and stores this information into its own memory area. LEXNPA•DLL then interprets the message (similar to function block 232 on FIG. 4A). The contents of this message preferably include a printer identification number and the general category of the Alert, as told by the printer. One of these categories may be a Job Accounting Alert. If the received message is not an Alert, the data is processed in the normal manner (similar to function block 229 on FIG. 4A). LEXNPA•DLL then transfers the Alert data from its own memory buffer into the buffer that was passed by LEXPANEL, and completes the above call. After the data is copied, LEXNPA•DLL frees the memory it had allocated. At this point, the processing of the Alert that is unique to the "idle" state is complete.

It will be understood that there are a variety of other scenarios which are not described herein that primarily involve standard error recovery paths through the computer programming (many of which are known in the art), and do not constitute a part of the claimed invention. Those skilled in the pertinent art would, however, recognize the need for such error recovery paths.

It will be further understood that the interrupt generation within the host computer (described above for "idle" mode) may not occur in all situations, even though an interrupt is generated by the printer. If the printer generates an Alert interrupt at the same time that printing is occurring in the same data channel, the call back to LEXNPA•DLL most likely will not occur, because LEXNPA•DLL already got around to reading it based on the normal logical flow when finished writing a data packet (in function block 220 on FIG. 4A).

FIGS. 5A–5D depict the flow chart of the logical steps that a preferred laser printer performs to receive print job data and to send job accounting information to a host computer. This printer procedure, generally designated by the index numeral 300, begins by initializing the laser printer under control of function block 310, at which time the Emulations Manager allocates memory for twenty-five (25) job structures. Typical information included in each job structure is the job name, job identification, number of pages printed, a default print environment, and other NPAP strings. The job structure, however, does not include any data. The job structure can be modified by the Data Stream Manager, however, the job identifier is never modified. The job structure can also be modified by the page queue manager, specifically the "number of pages printed" parameter can be modified.

After the initialization steps have been completed, the logical flow follows arrow 311 to a function block 312 under which job print data is received. As a data stream is received, the Emulations Manager assigns a job structure for this particular data stream. The incoming data is placed into the appropriate I/O BIOS (e.g., I/O port BIOS 61, 71, 81, or 91), and the received data is read into one of the NPAP input ring buffers 101–104.

The received job print data can either be NPAP or non-NPAP data, and it can arrive at any one of the ports of laser printer 13. In the preferred embodiment, an Alert can be sent after the print job is finished, regardless of whether the incoming print job data was NPAP or non-NPAP data. If the incoming data stream is through the parallel port 31, an Alert is sent only if there is an NPAP driver connected to the parallel port. Similarly, if the incoming data is through the serial port 41, an Alert is sent only if there is an NPAP driver connected to the serial port.

Figure 6:
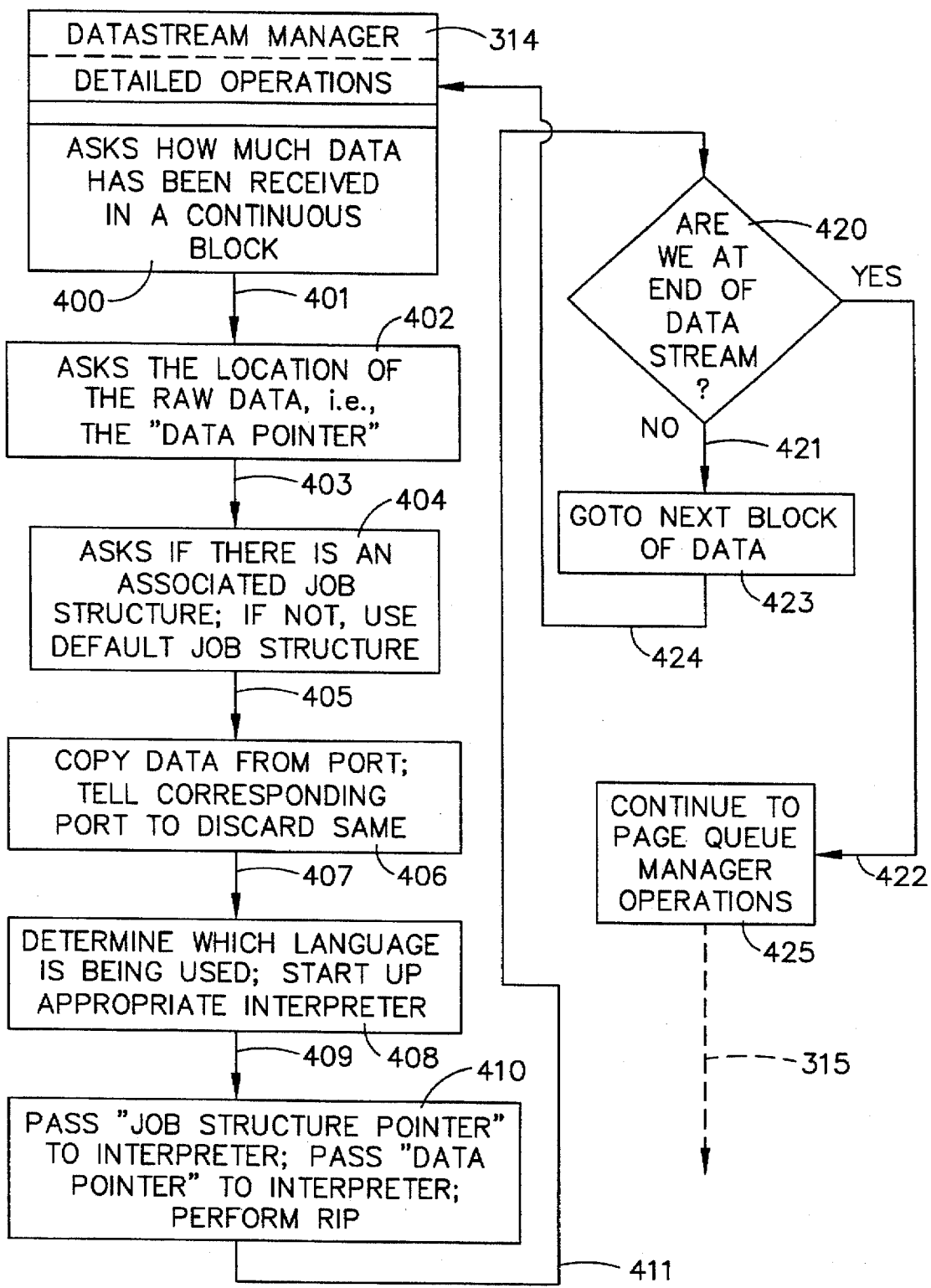
FIG. 6 is a flow chart of the detailed operations of the data stream manager function that is used in the flow chart depicted on FIG. 5A.

The logic flow now follows the arrow 313 to a function block 314, which is the Data Stream Manager. In essence, the Data Stream Manager asks for information about the received data and sends the data to the correct interpreter. The Data Stream Manager functions are depicted in greater detail in FIG. 6, and at function block 400, the Data Stream Manager asks how much data has been received in a continuous block by the pertinent NPAP input ring buffer. The Data Stream Manager then asks the location of the raw data in function block 402 (following arrow 401). The location of the raw data is preferably in the form of a "data pointer" which is an efficient method of communicating the location in random access memory (RAM) of a set of data waiting to be operated upon. Following the logical flow along arrow 403, the Data Stream Manager at a function block 404 asks if there is an associated job structure. If not, the "default job structure" is used, which is a pre-determined generic job structure available for use by the Data Stream Manager 120 and other tasks within printer 13.

Following the logic flow along arrow 405, a function block 406 copies data from the port (i.e., from the NPAP input ring buffer), then tells the corresponding port to discard that same data. A function block 408, following the logic flow along arrow 407, determines which language is being used by the incoming data, and (if necessary) the appropriate interpreter 122 is then started. Following the logical flow along arrow 409, the "job structure pointer" is passed (if necessary) to the interpreter, the "data pointer" is passed to the interpreter, and raster image processing is performed, under the control of function block 410.

After the RIP has been performed, the logical flow follows arrow 411 to a decision block 420 that asks if the printer has arrived at the end of the data stream. If the answer is NO, the logical flow follows arrow 421 to function block 423 which determines that the next block of data should then be operated upon. The logical flow follows arrow 424 back to the beginning of the logical operations performed by Data Stream Manager 120. If the answer to decision block 420 was YES, the logical flow follows arrow 422 to a function block 425 at which time it is determined that the Data Stream Manager has completed its logical operations, and the overall printer operations should continue to the next page queue manager operations (along arrow 315 as seen on FIG. 5A).

The page queue manager 124 now operates according to a function block 316. At the end of each page, the Emulations Manager is informed whether or not a new page was printed. The logical flow now follows arrow 317 to a function 318 which controls the operations of the Print Engine BIOS, and which prints the data stream for one page. Following at the arrow 319 to a function block 320, the page queue manager 124 now tells the Emulations Manager that a page is done once the Print Engine reaches the end of each page. The job structure pointer is passed to the Emulations Manager 132.

Following the logical flow along arrow 321, the Emulations Manager at a decision block 330 determines whether or not the printer has reached the end of the job. If the answer is NO, the logical flow follows arrow 332 to a function block 333 which determines that printing should be continued. The logical flow then follows arrow 334 back to the page queue manager for its operations at the beginning of each page, according to function block 316. If the answer to decision block 330 is YES, the logical flow follows arrow 331 to a function block 340. At this time, the Emulations Manager 132 tells the NPAP Task 100 that the print job is done, and sends the job structure pointer to the NPAP. It will be understood that after the end of a particular print job, the Emulations Manager 132 and Print Queue Manager 124 will continue to print other jobs.

The logical flow now follows arrow 341 to function block 342. The NPAP Task 100 now post a Job Accounting Alert to the appropriate ports. If the port that received the print job was the parallel port, then decision block 343 guides the logical flow along arrow 344 to the letter "C", and over to FIG. 5B. If the port that received the print job was an INA, then decision block 345 directs the logical flow along arrow 346 to the letter "D", and onto FIG. 5C.

Figure 5A:
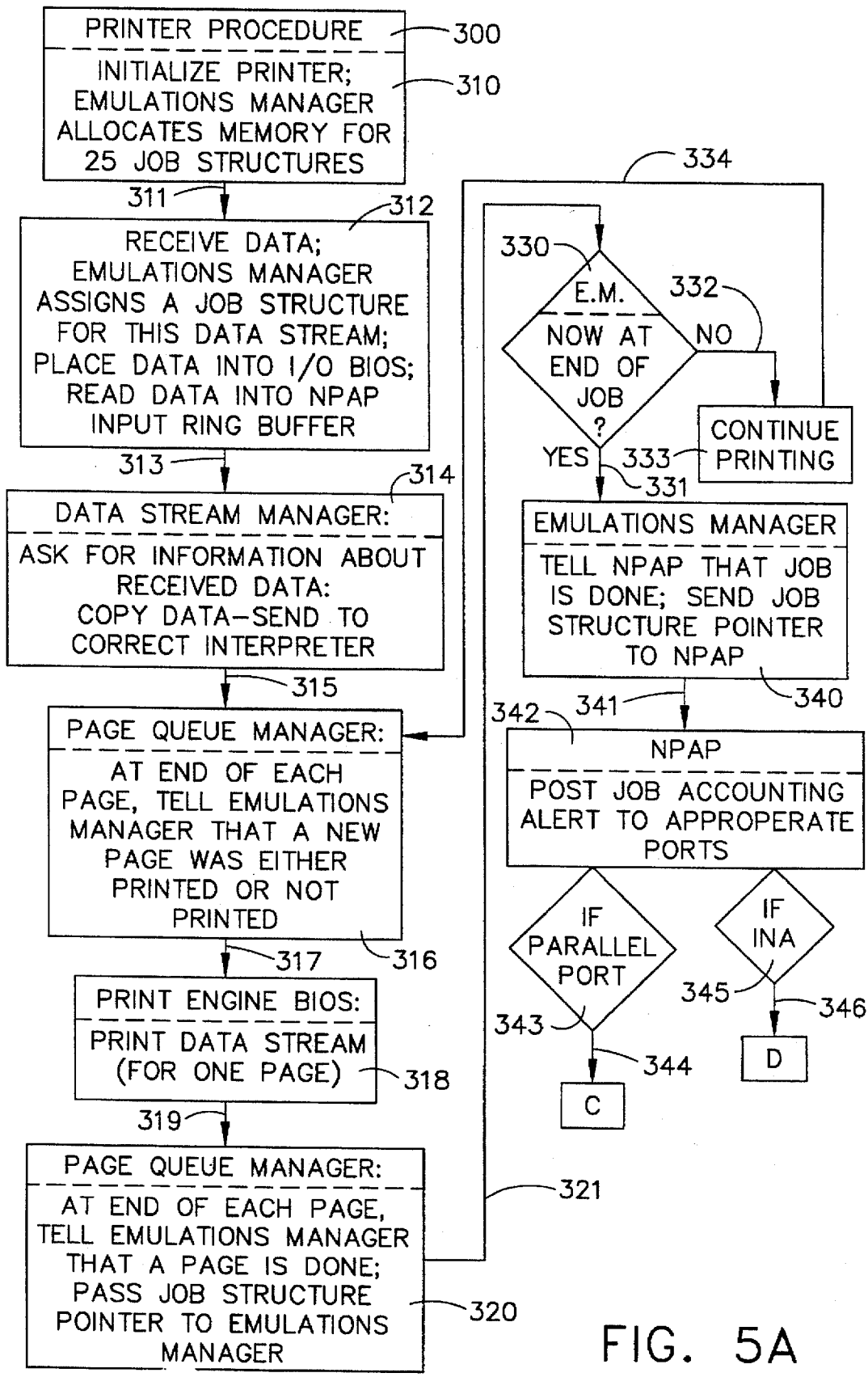
FIGS. 5A, 5B, 5C, and 5D represent a flow chart of the operation of the printer of FIG. 1, depicting the logical operational steps required to start up the operation of the job tracking function, to receive print job data from a host computer and print the job, to post a Job Accounting Alert at the end of the print job, to determine which host computers are armed to receive Job Accounting Alert data, and then to communicate the job accounting information to the appropriate host computers.
Figure 5B:
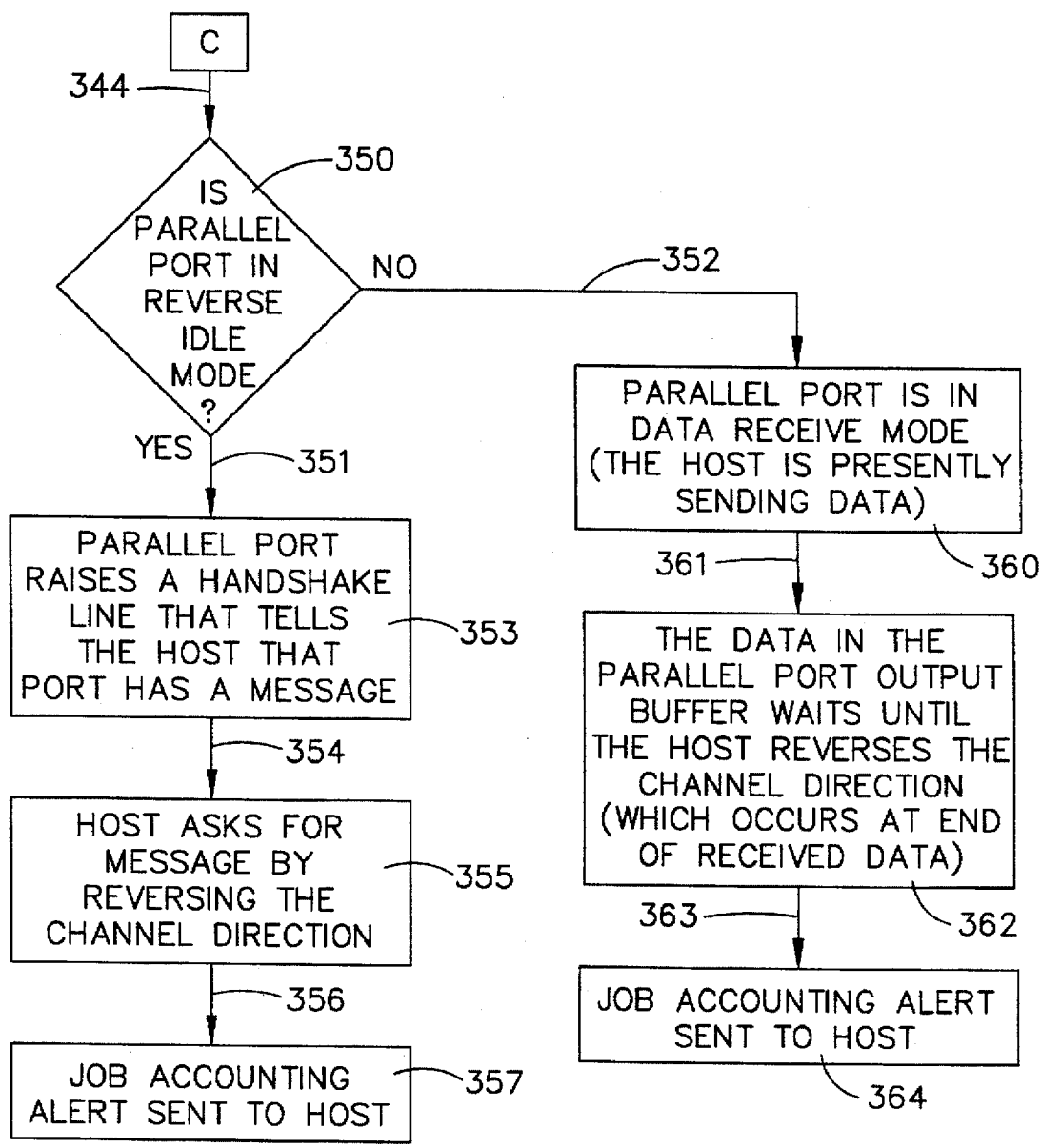

Starting at "C" on FIG. 5B, the logical flow arrives at a decision block 350 which asks if the parallel port is in the "reverse idle" mode. If the answer is NO, the logical flow is directed along arrow 352 to a function block 360 which determines that the parallel port is presently in the "data receive" mode, meaning that the host computer is presently sending data to laser printer 13. Following the logical flow along path 361, the data is temporarily stored in the parallel port output buffer until the host reverses the channel direction under the control of a function block 362. The channel direction is reversed at the end of the received data, i.e., at the end of the current packet of information pertaining to the received print job data. Once the channel direction has reversed, the logical flow follows arrow 363 to a function block 364 at which time the Job Accounting Alert is communicated to the host computer 32.

If decision block 350 determines that the parallel port is already in the reverse idle mode, then the logical flow follows path 351 to a function block 353, at which time the parallel port raises a handshake line that tells the computer that the parallel port has a message. Following logical flow along arrow 354, the host then asks for the message by reversing the channel direction under the control of a function block 355. Following the logic flow along arrow 356, a function block 357 then sends the Job Accounting Alert to the host computer 32. After this occurrence, the printer 13 will process the next print job.

Figure 5C:
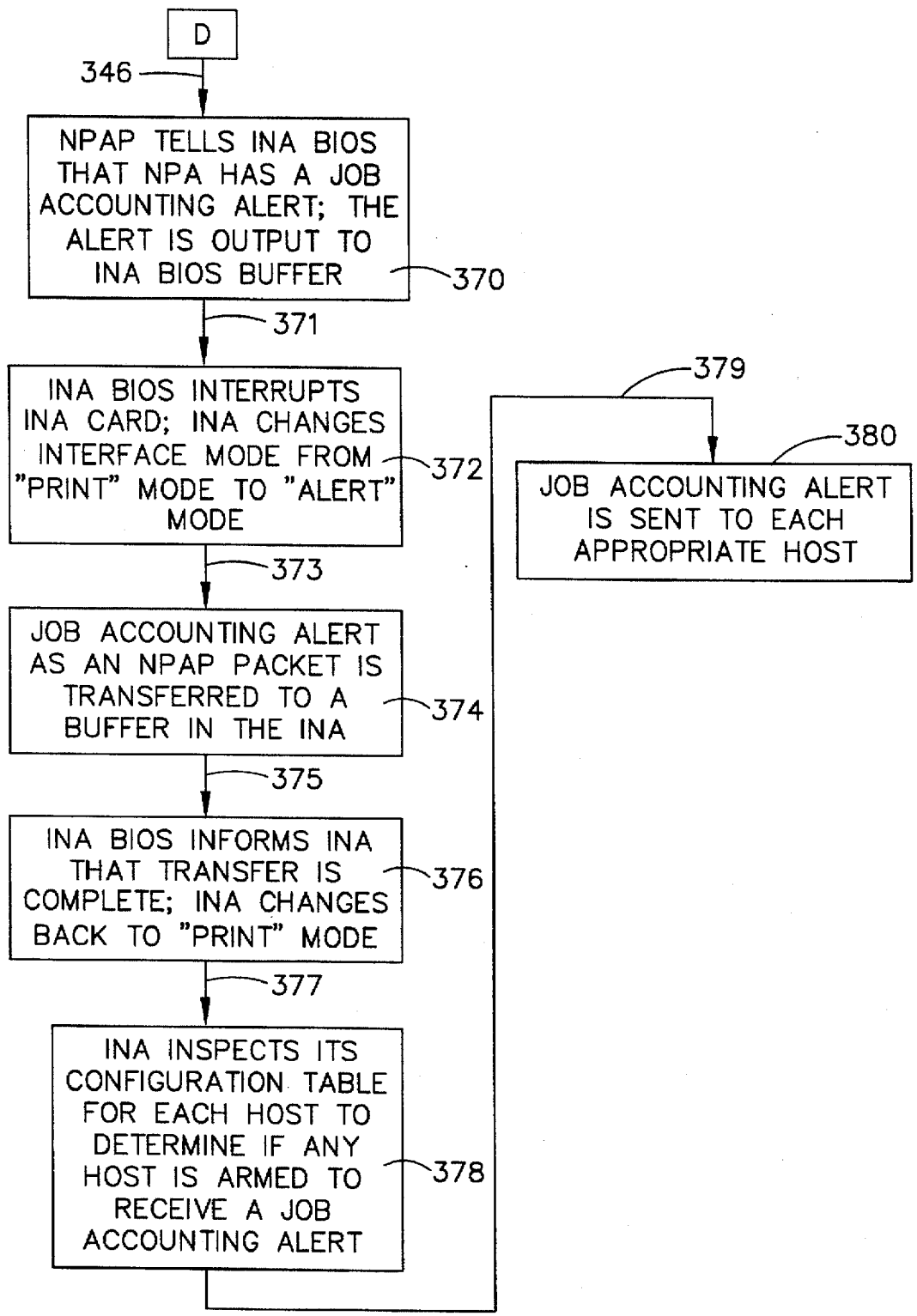

Starting with "D" on FIG. 5C, a function block 370 causes the NPAP Tasks to inform the INA BIOS that the NPAP has a Job Accounting Alert. The Alert is then output to the INA BIOS buffer. The logical flow follows path 371 to a function block 372 which causes the INA BIOS to interrupt the INA card. The INA card changes interface mode from "print" mode to "Alert" mode. Following the logic flow along arrow 373, the Job Accounting Alert as an NPAP packet is transferred to a buffer in the INA under the control of a function block 374. Following the logic flow along arrow 375, the INA BIOS informs the INA card that the transfer is complete under the control of a function block 376. At this time, the INA card changes back to "print" mode.

Following the logical flow along arrow 377, a function block 378 causes the INA to inspect its configuration table for each host computer that it is aware of to determine if any host is "armed" to receive a Job Accounting Alert. Following the logical flow along arrow 379, a function block 380 causes the Job Accounting Alert to be sent to each appropriate host computer. For example, if INA1 (i.e., INA port 11) wishes to send a Job Accounting Alert via LAN1 to its respective host computers, it would become aware that host computer 16 has MARKVISION™ installed. If host computer 16 is presently armed to receive Job Accounting Alerts, then INA1 would send the Job Accounting Alert to host computer 16 at this time.

Figure 5D:
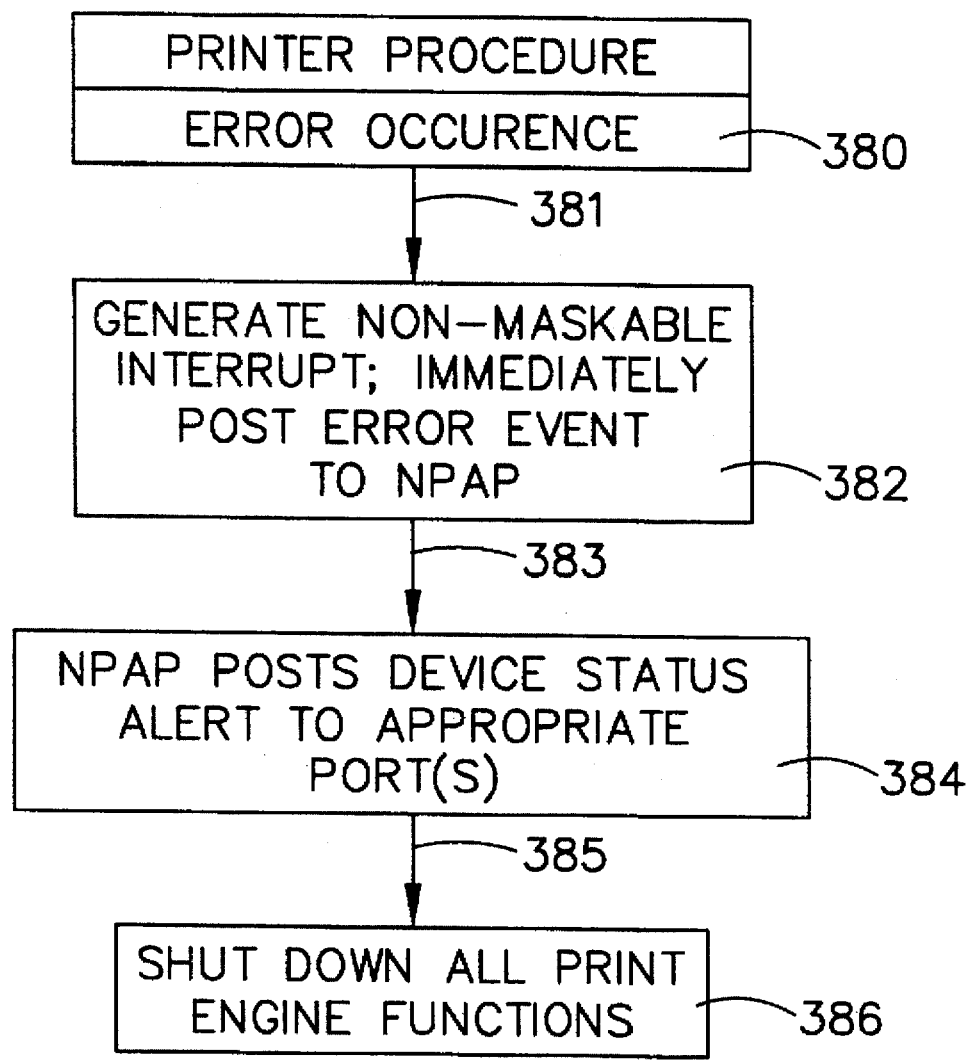

FIG. 5D depicts other portions of the printer procedure that are not part of the normal logical flow. If an error occurs, for example, the printer procedure 380 is invoked, and by following the logical flow along arrow 381, a non-maskable interrupt is generated by a function block 382. The error event is immediately posted to the NPAP. Following the logical flow along arrow 383, the NPAP posts the error event in the form of a Device Status Alert (DSA) to the appropriate port or ports under the control of a function block 384. Following the logical flow along arrow 385, a function block 386 causes all Print Engine functions to be shut down at this time. The type of error that can cause this to occur can be as simple as the printer cover being opened, however, this error condition must be corrected before laser printer 13 can resume its normal operations.

Many optional features could easily be incorporated in job accounting information, including host drivers that allow the user to designate special data fields. Other features could be incorporated which allow only Systems Administrators or Network Administrators to designate a special data fields. In addition, the format and content of the data provided in a Job Accounting Alert message from a printer to a host, and the corresponding job statistics data file created by the host computer based upon the job accounting information can be reconfigured or added to or subtracted from without departing from the principles of the present invention.

As an example of a host driver that allows a user to designate special data fields, user could designate each print job with a special name. Using NPAP-type commands, an example of such a message transmitted by a host and its corresponding printer response is provided in Table #3, below:

TABLE 3

6-5 Job Accounting, Job Management
6-5-1 Name Print Job

Command: Lexmark Extension
Subcommand: Name Print Job

| Byte | Value - Hex | Description | Notes |
|---|---|---|---|
| | | Host Command | |
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension | |
| 1 | 02 | Subcommand: Name Print Job | Data Field |
| 2 | Unsigned Word | Printer assigned Job ID | |
| 1 | Unsigned Byte | Length of Job Name, not including this byte. | |
| n | ASCII | Name to assign to this Print Job | |
| | | Printer Response | |
| 1 | A5 | Start of Packet Byte | Packet Header |
| 2 | 00 03 | Length in Bytes (Does not include these 2 bytes nor the SOP byte) | |
| 1 | Bit Encoded Byte | Flag | |
| 1 | E0 | Command: Lexmark Extension | |
| 1 | 02 | Subcommand: Name Print Job | Data Field |

Note: This command is only available in printer specific extension revision level 2 or greater.
Notes: The name should be in the form of Key:Value; pairs. More information on
Key:Value; pairs can be found in the base NPA spec, RDC, Options Char.
This Field is independent of the PJL command to name print jobs.
If this command is received on an INA status channel, the corresponding data
channel's list of jobs will be checked for the specified job.

TABLE 3-continued

6-5 Job Accounting, Job Management
6-5-1 Name Print Job

Command: Lexmark Extension
Subcommand: Name Print Job

| Byte | Value - Hex | Description | Notes |
|---|---|---|---|

While there are no restrictions on the name, Lexmark INA's will use the following naming conventions for the Key:Value; pairs:

| Key | Meaning |
|---|---|
| HT | Host Name |
| UR | User Name |
| SC | Source Protocol |
| JN | Job Name |
| QU | Queue Name |

In the preferred embodiment for this option, the host computer would be communicating to the laser printer through an INA, and this optional feature would be enabled upon the initializing of the job accounting "tracking" function at the host PC.

Another optional feature that can be implemented along with the present invention is a "start job" command that includes an ASCII string that will describe the job. An example of the host command and corresponding printer response is provided below in Table #4:

TABLE 4

6-5-2 Lexmark's Start Job

Command: Lexmark Extension
Subcommand: Name Print Job

| Byte | Value - Hex | Description | | Notes |
|---|---|---|---|---|
| | | Host Command | | |
| 1 | A5 | Start of Packet Byte | | Packet Header |
| 2 | Unsigned Word | Length in Bytes (Does not include these 2 bytes nor the SOP byte) | | |
| 1 | Unsigned Byte | Flag | | |
| 1 | E0 | Command: | Lexmark Extension | |
| 1 | 30 | Subcommand: | Start Job | Data Field |
| 1 | Unsigned Byte | LU ID | | |
| 1 | Bit Encoded Byte | Job Alert Points | | |
| | Bit 0 | Reserved | | |
| | Bit 1 | Logical Unit Start | | |
| | Bit 2-6 | Reserved | | |
| | Bit 7 | Job Complete | | |
| 1 | 0 | Reserved. Must be 0. | | |
| 1 | Unsigned Byte | Length of Host String | | |
| n | ASCII | Host String | | |
| | | Printer Response | | |
| 1 | A5 | Start of Packet Byte | | Packet Header |
| 2 | 00 06 | Length in Bytes (Does not include these 2 bytes nor the SOP byte) | | |
| 1 | Bit Encoded Byte | Flag | | |
| 1 | E0 | Command: | Lexmark Extension | |
| 1 | 30 | Subcommand: | Start Job | Data Field |
| 1 | Unsigned Byte | LU ID | | |
| 2 | Unsigned Word | Printer Assigned Job ID | | |

Note: This command is only available in printer specific extension revisio level 3 or greater.
This command will perform the same functions as the standard Job Control Start Job command. In addition it will accept an ASCII string that will describe the job. This string and the Lexmark extension "Name Print Job" will be concatenated and echoed n the Lexmark Job Accounting Alert. Because they will concatenated, these strings should be in the form of KEY:VALUE; pairs so that current applications will be able to parse the composite string.
The Host String and the "Name Print Job" string will co-exist in a single internal buffer of length 255 bytes. at POR, all 255 bytes are allocated to the "Name Print Job" string. This assures compatibility with current host implementations of the "Name Print Job" string. The user can reapportion the size allotment with the Lexmark Extension E0 31 "Set Name Job String Partition". This allocation occurs on a per port basis.
If the Host String will not fit in the allocated buffer space, the command is accepted but the string is ignored.
The following conditions MUST be met for NPA to accept the command:
• Valid Logical Unit ID.
• Two bytes of alert points, even if the bytes are x'00'.
• There must be at least enough bytes in the packet to satisfy the Host String Count.

An additional NPAP-type message can be utilized with the above optional features, in which the "name print job" and "job start" messages are both contained in a single internal buffer of 255 bytes in length. Since two separate packets of data are to be stored in the same buffer, the buffer must be partitioned so as to know which portion of the buffer is for which packet of information. A "set name job string partition" message can be implemented using the example host command and corresponding printer response provided in Table #5, below:

gathers its own job accounting information, it can either immediately transmit that information back to whatever host computers are interested in receiving that information, or it can store that information for a certain time period, depending upon the system operating conditions and the desirability of delaying transfer of such information. A laser printer could be enhanced by the addition of a floppy disk drive or a hard disk drive to store information at the laser printer, such as accumulated job accounting information. With a large capacity storage media available inside a laser printer,

TABLE 5

6-5-3 Set Name Job String Partition

Command: Lexmark Extension
Subcommand: Set Name Job String Partition

| Byte | Value - Hex | Description | | Notes |
|---|---|---|---|---|
| | | Host Command | | |
| 1 | A5 | Start of Packet Byte | | Packet Header |
| 2 | 00 04 | Length in Bytes (Does not include these 2 bytes nor the SOP byte) | | |
| 1 | Unsigned Byte | Flag | | |
| 1 | E0 | Command: | Lexmark Extension | |
| 1 | 31 | Subcommand: | Set name Job String Partition | Data Field |
| 1 | Unsigned Byte | Number of bytes for the Name Job String (Extension E0 02) | | |
| | | Printer Response | | |
| 1 | A5 | Start of Packet Byte | | Packet Header |
| 2 | 00 03 | Length in Bytes (Does not include these 2 bytes nor the SOP byte) | | |
| 1 | Unsigned Byte | Flag | | |
| 1 | E0 | Command: | Lexmark Extension | |
| 1 | 31 | Subcommand: | Set name Job String Partition | Data Field |

Note: This command is only available in printer specific extension revision level 3 or greater.
All bytes that are not used for the Name Job String are available to the Start Job(E0 30) Host String.

As part of the optional features described above, a "read name job string partition" command would be useful, and the appropriate host command and corresponding printer response are provided in Table #6, below:

such job accounting information could be accumulated for days or even weeks at the laser printer itself. Of course, that same information could be periodically transferred to one or more host computers, as desired, and the disk drive at the

TABLE 6

6-5-4 Read Name Job String Partition

Command: Lexmark Extension
Subcommand: Read Name Job String Partition

| Byte | Value - Hex | Description | | Notes |
|---|---|---|---|---|
| | | Host Command | | |
| 1 | A5 | Start of Packet Byte | | Packet Header |
| 2 | 00 04 | Length in Bytes (Does not include these 2 bytes nor the SOP byte) | | |
| 1 | Unsigned Byte | Flag | | |
| 1 | E0 | Command: | Lexmark Extension | |
| 1 | 32 | Subcommand: | Read Name Job String Partition | |
| | | Printer Response | | |
| 1 | A5 | Start of Packet Byte | | Packet Header |
| 2 | 00 03 | Length in Bytes (Does not include these 2 bytes nor the SOP byte) | | |
| 1 | Unsigned Byte | Flag | | |
| 1 | E0 | Command: | Lexmark Extension | |
| 1 | 32 | Subcommand: | Read Name Job String Partition | Data Field |
| 1 | Unsigned Byte | Number of bytes for the Name Job String (Extension E0 02) | | |

Note: This command is only available in printer specific extension revision level 3 or greater.
All bytes that are not used for the Name Job String are available to the Start Job(E0 30) Host String.

It will be understood that many various optional features can be added to the host computers and laser printers that utilize the principles of the present invention. As each printer laser printer could be made to further accumulate such job accounting information or to erase portions of it, under the control of a Network Administrator or a Systems Administrator. Such uses of the laser printer job accounting information are some of the enhanced features contemplated by the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A printing system including a host computer, a printer, and a communications link therebetween, said printing system comprising:
    (a) a computer having a storage medium for holding data, a first memory circuit for temporary storage of data, a first communications port that receives and transmits data, a first processing circuit that controls the routing of data between said storage medium, said first memory circuit, said first communications port, and a video monitor;
    (b) a printer having a bi-directional communications capability, a second memory circuit for storage of data, a second communications port that receives and transmits data, a print engine, a second processing circuit that controls the routing of data between said second memory circuit, said print engine, and said second communications port, said second processing circuit being configured to gather accounting information related to parameters of usage of said printer, said second communications port being configured to automatically transmit, without any polling by said computer, said printer accounting information, after each print job is received and processed, to said communications link;
    (c) said first communications port being configured to transmit data to be printed by said printer and to receive said printer accounting information from said communications link; and
    (d) said first memory circuit being configured to store said printer accounting information as it is received at said computer, and said storage medium being configured to hold said printer accounting information in a format usable by a database program such that said printer accounting information is retrievable by the database program and said printer accounting information is displayable upon said video monitor; wherein said printer accounting information for each print job comprises at least one of a job identifier number, job processing time, number of sheets of paper from each paper source, number of impressions from each paper source, port identifier, and the printer's serial number.

2. The printing system as recited in claim 1, wherein said printer is a laser printer and said second communications port is one of a plurality of communications ports included in the printer.

3. The printing system as recited in claim 1, wherein said printer is an ink jet printer and said second communications port is one of a plurality of communications ports included in the printer.

4. The printing system as recited in claim 1, wherein said second communications port is a parallel port.

5. The printing system as recited in claim 1, wherein said second communications port is a serial port.

6. The printing system as recited in claim 1, wherein said second communications port is a network communications port.

7. The printing system as recited in claim 6, wherein said network communications port resides on an intelligent network adapter.

8. The printing system as recited in claim 1, wherein said printer accounting information format is comma-delimited ASCII data.

9. The printing system as recited in claim 1, further comprising a second computer having a second storage medium for holding data, a third memory circuit for temporary storage of data, a third communications port that receives and transmits data, a third processing circuit that controls the routing of data between said second storage medium, said third memory circuit, said third communications port, and a second video monitor, wherein said third communications port is configured to receive said printer accounting information from said communications link, said third memory circuit is configured to store said printer accounting information as it is received at said second computer, and said second storage medium being configured to hold said printer accounting information in a format usable by a second database program such that said printer accounting information is retrievable by the second database program and said printer accounting information is displayable upon said second video monitor.

10. The printing system as recited in claim 1, further comprising a second storage medium for holding said printer accounting information, said second storage medium residing within said printer.

11. The printing system as recited in claim 1, wherein said second processing circuit includes a Network Printing Alliance Protocol processing circuit capable of receiving and transmitting information that conforms to the Network Printing Alliance Protocol.

12. The printing system as recited in claim 1, wherein said database program is a spreadsheet.

13. A printing system including a plurality of host computers, a printer, and a communications link therebetween, said printing system comprising:
    (a) a first computer having a first memory circuit for temporary storage of data, a first communications port that transmits data, a first processing circuit that controls the routing of data between a storage medium, said first memory circuit, and said first communications port;
    (b) a printer having a bi-directional communications capability, a second memory circuit for storage of data, a second communications port that receives data, a third communications port that transmits data, a print engine, a second processing circuit that controls the routing of data between said second memory circuit, said print engine, said second communications port, and third communications port, said second processing circuit being configured to gather printer accounting information related to parameters of usage of said printer, said second communications port being configured to receive print job data from said communications link, and said third communications port being configured to transmit said printer accounting information to said communications link;
    (c) a second computer having a second storage medium for holding data, a third memory circuit for temporary storage of data, a fourth communications port that receives data, a third processing circuit that controls the routing of data between said second storage medium, said third memory circuit, said fourth communications port, and a video monitor;

(d) said first communications port being configured to transmit data to be printed by said printer;

(e) said fourth communications port being configured to receive said printer accounting information from said communications link; and (f) said third memory circuit being configured to store said printer accounting information as it is received at said second computer, and said second storage medium being configured to hold said printer accounting information in a format usable by a database program such that said printer accounting information is retrievable by the database program and said printer accounting information is displayable upon said video monitor.

14. The printing system as recited in claim 13, wherein said fourth communications port of said second computer is further configured to transmit data to be printed by said printer.

* * * * *